United States Patent Office 3,845,168
Patented Oct. 29, 1974

3,845,168
TRIMETHYLOL PROPANE PHOSPHITE
Alvin Guttag, Bethesda, Md., assignor to Weston
Chemical Corporation, New York, N.Y.
No Drawing. Application Jan. 16, 1970, Ser. No. 3,501,
which is a continuation-in-part of application Ser. No.
758,701, Sept. 10, 1968, now abandoned. Divided and
this application Dec. 13, 1971, Ser. No. 207,694
Int. Cl. C07f 9/08
U.S. Cl. 260—927 R
11 Claims

ABSTRACT OF THE DISCLOSURE

Phosphites, useful for stabilizing polymers, are provided of the formulae

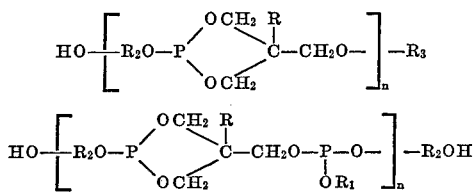

and triads and polymers of triads of the formula

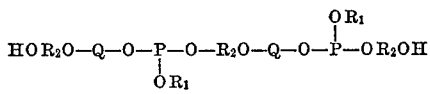

where $n$ is at least 1, R is H or alkyl, $R_1$ is aryl, alkyl, haloaryl, haloalkyl, alkaryl, alkenyl and haloalkenyl, $R_2$ is a hydrogenated dihydric phenol moiety, $R_3$ is H or $R_1$, and Q is

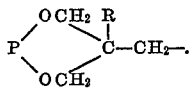

This is a division of application Ser. No. 3,501, filed Jan. 16, 1970, which in turn is a continuation-in-part of Ser. No. 758,701, filed Sept. 10, 1968, now abandoned.

The present invention relates to novel phosphites.

It is an object of the present invention to prepare novel phosphites.

Another object is to develop novel stabilizers for hydrocarbon polymers, halogen-containing polymers, natural and synthetic rubbers and other polymers.

Still further objects and the entire scope of applicability or the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphites having the formula (1a)

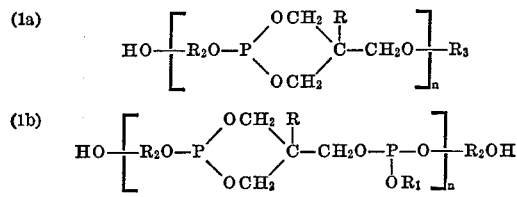

where R is H or alkyl, $R_1$ is aryl, alkyl, haloaryl, haloalkyl, alkaryl, alkenyl and haloalkenyl, $R_2$ is a hydrogenated dihydric phenol moiety, $R_3$ is H or $R_1$ and $n$ is an integer of at least 1 and can be 10, 20 or even 100 or more.

The products of the invention of formula (1a) may be prepared in several fashions. Thus, a 1,3,2-dioxaphosphorinane of the formulae (1b)

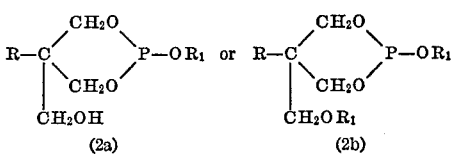

is reacted with a hydrogenated dihydric phenol of the formula (3)            HO—$R_2$—OH where R and $R_1$ are as above and $R_2$ is a hydrogenated dihydric phenol moiety. For each repeating unit above 1, one less mole of the compound of formula (3) is used than the number of moles of formula (2a) or (2b), when no end group reaction is desired. One additional mole of the compound of formula (3) is required for each end group to be reacted. The reaction proceeds with the splitting out of either water and/or the corresponding alcohol, $R_1OH$ for each repeating unit. The number of moles of $R_1OH$ split out will increase by 2 for each additional repeating unit above 1. Of course, the use of an appropriate number of additional moles of the hydrogenated dihydric phenol will be required to also provide hydrogenated dihydric phenol end groups.

The compounds of formula (2a) may be prepared by reacting on a mole-to-mole basis a trimethanol alkyl of the formula (4)

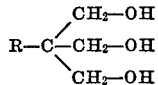

where R is as above, with a triphosphite of the formula (5)

where $R_1$ may be the same or different and as above and stopping the reaction when two moles of the corresponding alcohol or phenol, $R_1$—OH are split off.

Alternately, the mono ethers of the trimethanol alkyls of formula (4) may be prepared and reacted with the compounds of formula (5) to provide the starting material of formula (2b) to make novel monomers. The ethers may be made, for example, by reacting one mole of the compound of formula (4) with 1 mole of an alcohol of the formula $R_1OH$, where $R_1$ is as above, in the presence of an acid catalyst, e.g. sulfuric acid, and splitting out 1 mole of water.

The phosphite of formula (1b) may be prepared by reacting the compound of formula (2a) on a mole-to-mole basis, with the phosphites of formula (5) and with splitting off one mole of $R_1OH$ to form the compounds of the formula:

(6)

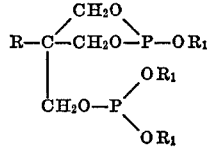

Or alternately a chlorophosphite may be reacted instead of the compounds of formula (5) e.g.

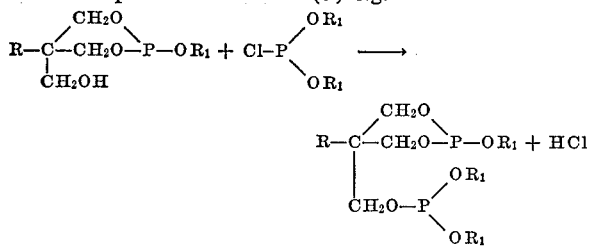

Thereafter the compounds of formula (6) are reacted with the compounds of formula (3). For each repeating unit above 1, i.e. 2 or more, 1 less mole of the compound of formula (3) is used than the number of moles of formula (6), when no end group reaction is desired. When end group reaction is desired, 1 mole of the compound of formula (3) is required for each end group. Again the number of moles of $R_1OH$ split out were increased by 2 for each additional repeating unit above 1. The splitting out of $R_1$—OH is preferably continued until a molecular weight of the product of about at least 1000 is obtained, e.g. 1000 to 30,000 preferably 1500 to 4000 such as as 3000. Of course, the mole bases of the reaction may be varied depending upon the end groups desired. While formula (1a) and (1b) are shown with end groups, those formulae are intended to also include, by definition, the same compounds but without any end groups or with at least one end group reacted.

Hence, if about 3 moles of the compounds of formula (3) are used for about 2 moles of the compounds of formula (6) when four moles of $R_1OH$ are split out the products formed are of the formula

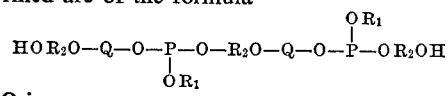

where Q is

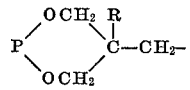

and R, $R_1$ and $R_2$ are as above. This corresponds to formula (1b) where $n$ is 2 and each end group has been reacted. However, when additional moles of (3) and (6) are used, reactions between units across the other $OR_1$ group will occur and the triads of the formula (7)

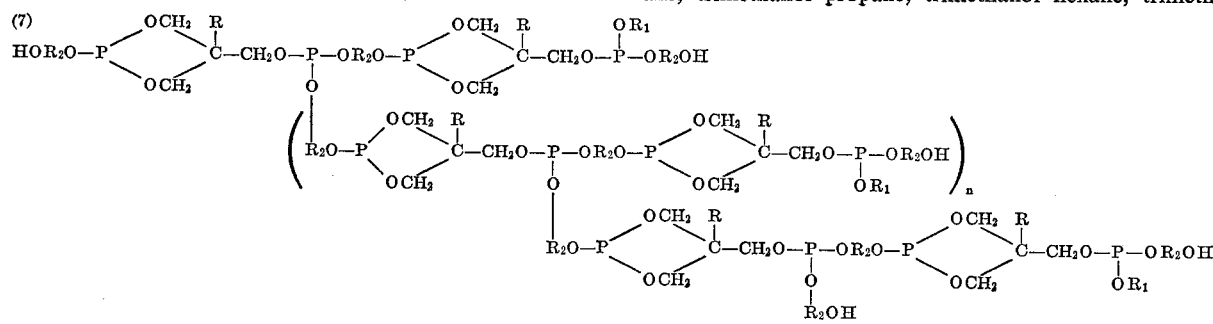

or the position isomers thereof are produced when the number of moles of $R_1OH$ per repeating unit are split cut according to the following table.

| Triads n | $R^1OH$ out (moles) | |
|---|---|---|
| | Total | Per "n" |
| 1 | 4 | 4 |
| 2 | 9 | 4.5 |
| 3 | 14 | 4.67 |
| 4 | 19 | 4.75 |
| 5 | 24 | 4.80 |
| 6 | 29 | 4.83 |
| 7 | 34 | 4.85 |
| 8 | 39 | 4.86 |
| 9 | 44 | 4.88 |
| 10 | 49 | 4.89 |
| 11 | 54 | 4.91 |
| 12 | 59 | 4.91 |
| 17 | 84 | 4.94 |

Turning now to a more specific description of the compounds used with the present invention R may be hydrogen and alkyl up to 20 carbon atoms, e.g. methyl, ethyl, propyl, hexyl, octyl, decyl, dodecyl, hexadecyl, octadecyl and eicosyl. $R_1$ may be alkyl or haloalkyl of up to 20 carbon atoms, e.g. methyl, ethyl, propyl, butyl, isobutyl, amyl, octyl, decyl, isodecyl, dodecyl, hexadecyl, octadecyl, eicosanyl, etc., and chloromethyl, chloroethyl, 1-chloropropyl, chloropropyl, chlorodecyl, chlorododecyl, bromohexadecyl and idooctadecyl, etc. Suitably the haloalkyl is a mono or disubstituted haloalkyl and the halogen substituent is chlorine, bromine or iodine. The position of the halo substitutent is not important and may be in any position. Also $R_1$ may be aryl, alkaryl or haloaryl, with the alkyl substituent as described above, i.e. up to 20 carbon atoms, and again the halo atom or atoms being suitably a mono or disubstituted haloaryl, e.g. benzyl, naphthyl, phenyl, p-methyl phenyl, o-methyl phenyl, ethyl phenyl, m-propyl phenyl, hexyl phenyl, p-nonyl phenyl, dodecyl phenyl, p-octadecyl phenyl, etc., and the alkaryl being suitably a monor or disubstituted with halo as described above. $R_1$ also can be alkenyl, e.g. allyl, crotyl or oleyl.

For example, the 1,3,2 - dioxaphosphorinanes may be 2 - ethoxy - 5 - ethyl (5 - hydroxymethyl - 1,3,2 - dioxaphosphorinane). The 5 - hydroxymethyl - 1,3,2 - dioxaphosphorinane nucleus is designated as "A" and may also be 2 - ethoxy - 5 - methyl "A," 2 - ethoxy-5-propyl "A," 2 - ethoxy-5-hexyl "A," 2-ethoxy-5-decyl "A," 2-ethoxy-5-dodecyl "A," 2-ethoxy-5-octadecyl "A," 2-ethoxy-5-chloromethyl "A," 2-ethoxy - 5 - bromoethyl "A," 2-ethoxy-5-chlorohexyl "A," 2-ethoxy - 5 - idooctyl "A," and the same compounds as above but instead of the 2-ethoxy substituted dioxaphosphorinanes the 2 position may be substituted with, for example, a propoxy, decoxy, octadecoxy, oleyloxy, chloroethoxy, chloropropoxy, bromodecoxy, and iodohexoxy, phenoxy, chloro or bromo phenoxy, ethylphenoxy, hexylphenoxy, dodecylphenoxy, chloropentylphenoxy, bromododecylphenoxy, such compounds including 2-phenoxy-5-ethyl "A," 2 - p - nonylphenoxy-5-ethyl "A," 2-oleyloxy - 5 - ethyl "A," 2-octadecyloxy-5-ethyl "A," and the same compounds as above but the 5-hydroxymethyl group may instead be the methoxy ether thereof with the same substituents named above in the 2 position. Such compounds, of course are produced from the reaction of the trimethanol alkyls of formula (4) which may be for instance trimethanol ethane, trimethanol propane, trimethanol hexane, trimethanol heptane, trimethanol dodecane and trimethanol hexadecane, and the triphosphites of formula (5) which may be for instance trimethyl phosphite, triethyl phosphite, tributyl phosphite, trihexyl phosphite, tridodecyl phosphite, tri (chloroethyl) phosphite, tri (chlorohexyl) phosphite, tri (bromodecyl) phosphite, triphenyl phosphite, tri (ethylphenyl) phosphite, tri (butylphenyl) phosphite, tri (p-dodecylphenyl) phosphite, tri (p-octadecylphenyl) phosphite, tri (chloropentyl phenyl) phosphite, tri (chlorodecyl phenyl) phosphite, tri (bromooctadecyl phenyl) phosphite, methyl-diethyl phosphite, tri (p-nonylphenyl) phosphite, ethyl-dimethyl phosphite, methyl-dihexyl phosphite, methyl-dioctadecyl phosphite, ethyl-di (chloroethyl) phosphite, ethyl-di (chlorododecyl) phosphite, ethyl-di (bromohexadecyl) phosphite, hexyl-dioctadecyl phosphite, decyl-dibutyl phosphite, methyl-diphenyl phosphite, ethyl-di phenyl phosphite, hexyl-di phenyl phosphite, octadecyl-di phenyl phosphite, diphenyl oleyl phosphite, (diphenyl Δ9-octadecenyl phosphite), diethyl oleyl phosphite, diphenyl stearyl phosphite (diphenyl octadecyl phosphite), dibutyl stearyl phosphite, diphenyl hexadecyl phosphite, di-o-cresyl stearyl phosphite, triallyl phosphite, tricrotyl phosphite, dimethyl linoleyl phosphite, dimethyl stearyl phosphite, dimethyl oleyl phosphite, dimethyl tetradecyl phosphite, dimethyl lauryl phosphite, dimethyl alpha naphthyl phosphite, diphenyl beta naphthyl phosphite, diphenyl p-nonylphenyl phosphite, diphenyl o-octadecylphenyl phosphite, diphenyl m-octadecenyl phosphite (diphenyl oleyl phosphite), diphenyl 4 - t - butylphenyl phosphite, diphenyl 2,4-dichlorophenyl phosphite, diphenyl p-cyclohexylphenyl phosphite, triallyl phosphite, diphenyl 2,4-di(nonyl) phenyl phosphite, dimethyl 2,4 - di (2,4-dibutyl) phenyl phosphite, tris 2,4-xylenyl phosphite, tris 2,6-xylenyl phosphite.

Compounds such as dimethyl stearyl phosphite can be conveniently formed for example by heating 1 mole of trimethyl phosphite with 1 mole of stearyl alcohol, e.g. in the presence of a small amount of sodium methylate and removing 1 mole of methyl alcohol. Compounds such as diphenyl p-nonylphenyl phosphite can be formed in analogous fashion by heating 1 mole of triphenyl phosphite with 1 mole of p-nonylphenyl and removing 1 mole of phenol per se.

As used in the present specification and claims, the term hydrogenated dihydric phenol signifies that all of the aromatic double bonds have been completely hydrogenated. Examples of hydrogenated dihydric phenols used to form the products of the present invention are 4,4'-isopropylidene dicyclohexanol (also called bis (4 - hydroxycyclohexyl) dimethyl methane or hydrogenated Bisphenol A), di (4-hydroxycyclohexyl) methane, di (4-hydroxycyclohexyl), bis (2-hydroxycyclohexyl) dimethyl methane, 1,4-dihydroxycyclohexane, di (4 - hydroxy - 3-methylcyclohexyl)dimethyl methane, di (4 - hydroxy-3-methylcyclohexyl) methyl methane, di (4-hydroxy - 3-methyl cyclohexyl) cyclohexyl methane, di (4-hydroxycyclohexyl) sulfone, di (4-hydroxycyclohexyl) sulfide, di (3-hydroxycyclohexyl) dimethyl methane, 4,4' - methylene bis (2-methyl-6-t-butylcyclohexanol), di (4-hydroxycyclohexyl) ether 1,3-dihydroxycyclohexane, di (3-chloro-4-hydroxycyclohexyl) dimethyl methane.

The preferred starting hydrogenated dihydric phenols are bisphenol, the most preferred being hydrogenated Bisphenol A.

The 1,3,2-dioxaphosphorinanes of formula (2a), (2b) may be prepared by the reaction of the trimethanol alkyls of formula (4) with the triphosphites of formula (5) at room temperature or lower or at above room temperature, e.g. 20 to 100° C. and at atmospheric, superatmospheric or subatmospheric pressure, e.g. 5 mm. of Hg to 100 atmospheres. Preferably, however, the reaction is carried out under a vacuum of about 14 mm. of Hg or less and at a temperature sufficient to distill off the alcohol or water respectively, which is split out. Similarly, in forming the compounds of formula (6) or the products of the invention by the reaction of formulae (2a), (2b) or (6) with the hydrogenated dihydric phenol of formula (3), the same conditions may be used, and also the vacuum and temperatures noted above are also preferred in order to more easily remove the alcohol or water split out.

It should also be noted that by choosing different substituents for $R_1$ of formula (2b) or (6) or by choosing specific substituents for $R_1$ of formula (2a) various position isomers of the products can be obtained. For example, when the $R_1$ substituent on the methoxy group of (2b) is a lower alkyl e.g. ethyl and the $R_1$ substituent of phosphite moiety of formula (2b) is a higher alkyl or aryl, e.g. phenyl, the alcohol split out between the $R_1$ of the methoxy group and the OH group of the hydrogenated dihydric phenol will split out at a lower temperature (due to a lower boiling point of the resulting alcohol) than will the phenol split out between the $R_1$ of the phosphite moiety and the OH group of the hydrogenated dihydric phenol. Thus the product formed would have the repeating units

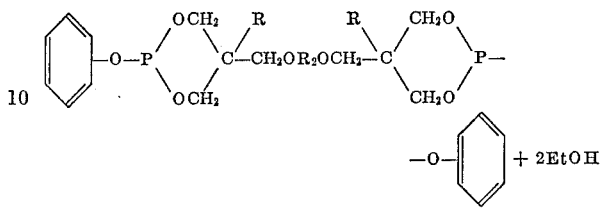

reacted at a lower temperature before a second molecule of HO—$R_2$—OH reacted with a phenyl group at the ends of the molecule. However, if the positions on the ethyl and phenyl group are the reverse of the above, the products formed would have the repeating units

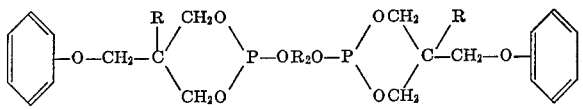

reacted at a lower temperature before the second molecule of HO—$R_2$OH reacted with a phenyl group on the ends of the molecule. Further, when $R_1$ is the same, a mixture of position isomers will result. The same situation is, of course, true for the product of formula (1b) as well as the triads of formula (7).

Under the circumstances, by choosing the specific substituents for $R_1$, one may produce nearly pure products of only one of various position isomers or a mixture thereof as described. As is quite apparent, the particular substituents for $R_1$ are chosen according to the boiling point of the alcohol (or phenol) split out at the pressure being used during the reaction.

In order to be concise in this specification and to not repeat details known to the art, additional details of such reactions will be apparent from the disclosures of U.S. Pats. 3,341,629, 3,293,327; and 3,053,878, which disclosures are hereby incorporated by reference.

The reactions set forth above are all preferably catalyzed with 0.1 to 5% based on the weight of the phosphite reactant or reactants of a catalyst which usually is a secondary phosphite, e.g., a dialkyl phosphite, a diaryl phosphite or a dihaloaryl phosphite or an alkyline catalyst. Examples of suitable catalysts are diphenyl phosphite, di (2-methylphenyl) phosphite, di (4-dodecylphenyl) phosphite, di (4-octadecylphenyl) phosphite, di (2-chlorophenyl) phosphite, di (2,4 - dimethylphenyl) phosphite, di (4-bromophenyl) phosphite, diethyl phosphite, dicyclohexyl phosphite, phenyl 3-methylphenyl phosphite, dioctadecyl phosphite, dimethyl phosphite, sodium phenolate, sodium decylate, potassium p-cresylate, sodium ethylate, sodium octadeconolate, sodium hydride, sodium metal, potassium metal, lithim methylate, sodium cetylate, trimethyl benzyl ammonium hydroxide and other quaternary ammonium hydroxides, sodium hydroxide, potassium hydroxide.

The compounds of the present invention are useful as heat and light stabilizers and as antioxidants. They appear to be more stable than the polymers prepared in the Friedman Pat. No. 3,053,878.

They can be readily ground for incorporation in an amount of 0.01 to 20% into various polymers such as halogen containing resins, e.g. vinyl chloride resins, as stabilizers against heat and light or as antioxidants. They are particularly useful in stabilizing rigid polyvinyl chlorde resns where many other phosphites are unsuitable.

Examples of halogenated polymers which can be stabilized with the phosphites of the present invention include chlorinated polyethylene having about 14 to about 75%, e.g. 26% chlorine, polyvinyl chloride, polyvinylidene chloride, polyvinyl bromide, polyvinyl fluoride, polyvinylidene fluoride, polytetrafluoroethylene, copolymers of vinylidene chloride and acrylonitrile (e.g. 80:20) or vinyl chloride (e.g. 85:15), copolymers of vinyl chloride with 1 to 90%, preferably 1 to 40%, by weight of copolymerizable materials such as vinyl acetate, vinylidene chloride, vinylidene fluoride, diethyl fumarate, diethyl maleate and other alkyl fumarates and maleates, vinyl propionate, methyl acrylate, ethyl acrylate, butyl acrylate, 2-ethylhexyl acrylate and other alkyl acrylates, methyl methacrylate, butyl methacrylate and other methacrylates, methyl alpha chloroacrylate, styrene, vinyl ethyl ether, vinyl methyl ketone, acrylonitrile, allylidene diacetate, trichloroethylene, etc. Typical copolymers include vinyl chloride-vinyl acetate (96:4), vinyl chloride-vinyl acetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-acrylonitrile (60:40), vinyl chloride-2-ethylhexyl acrylate (80:20). They can also be used to stabilize resins where the halogen-containing component is present in minor amount, e.g. acrylonitrile-vinyl chloride copolymer (85:15) or halogenated rubbers e.g. polychloroprene, chlorinated polyisobutylene, chlorinated natural rubber, chlorine containing polyurethanes, etc.

As is conventional in the art when the novel phosphites are employed with halogen-containing resins, there can be added barium, cadmium and zinc salts and synergistic activity is noted in this connection. Thus, there can be included 0.5 to 10% of salts such as mixed barium-cadmium laurates, barium laurate, cadmium laurate, zinc stearate, cadmium 2-ethyl hexoate, barium nonylphenolate, barium octylphenolate, barium stearate, zinc octoate.

There can also be incorporated in the vinyl chloride resins and the like 0.5 to 10% of organotin compounds, particularly sulfur-containing compounds such as dibutyltin bis(octylthioglycollate).

Conventional phenolic antioxidants can also be incorporated in an amount of 0.1 to 10%, e.g. 2,2-methylene bis (4-methyl-6-t-butylphenol), 2,4,6-tri-t-butylphenol, 4,4'-isopropylidenephenol, etc.

The novel phosphites of the present invention can also be incorporated in an amount of 0.01 to 20% as stabilizers for hydrocarbon polymers including monoolefin polymers such as polyethylene polypropylene, ethylene-propylene copolymers (e.g. 80:20, 50:50, 20:80), ethylene-propylene terpolymers, e.g. ethylene-propylene-cyclooctadiene terpolymer, ethylene-butene-1 copolymer, ethylene-decene-1 copolymer, polystyrene, polyolefin, e.g. diolefin polymers such as natural rubber, rubbery butadiene styrene copolymers (75:25, 60:40), cis isoprene polymer, polybutadiene, polyisobutylene, isobutylene-butadiene copolymer (butyl rubber, e.g. 97:3, 98.5:1.5). There can also be stabilized ABS rubbers and resins acrylonitrile-butadiene-styrene terpolymers, e.g. 50:40:10).

They can be used in an amount of 0.01 to 20% to stabilize polyurethanes, (e.g. from toluene diisocyanate and polypropylene glycol molecular weight 2025), polyesters, e.g. Dacron (polyethylene terephthalate), polymeric tetramethylene terephthale-isophthalate-sebacate, or unsaturated polyesters, e.g. ethylene glycol-propylene glycol adipate-maleate molecular weight 5000 and the corresponding polymer modified with 10% styrene, nylon, e.g. polyhexamethylene adipamide, Delrin (polymerized oxymethylene) and Celcon (oxymethylene copolymer), polyvinyl butyral, polysulfones from conjugated diolefins, sulfur dioxide and a mono-ethylenically unsaturated compound, e.g. a terpolymer of butadiene, sulfur dioxide and styrene as set forth in Example 1 of Mostert Pat. No. 3,377,324, polycarbonates e.g. the reaction product of Bis-phenol A with phosgene or diphenyl carbonate as well as other polycarbonates set forth in Fritz Pat. No. 3,305,520.

When incorporated in hydrocarbon polymers it is frequently advantageous to add conventional phenolic antioxidants as set forth above and conventional additives such as diluryl thiodipropionate.

They are also useful as stabilizers for foods, oils, lubricants, and other products which deteriorate on oxidation.

The compounds of the invention are also useful as flame and fire proofing additives in polyurethane, hydrocarbon polymers, cellulose esters and ethers, e.g. cellulose acetate, methyl cellulose, ethyl cellulose, cellulose acetate-propionate, etc.

The field of greatest utility at the moment, however, appears to be as stabilizers for rigid vinyl chloride resins. Since the compounds of the present invention are monomeric with readily defined structures, it is surprising that they will act as stabilizers for rigid vinyl chloride resins since the only phosphites previously found to satisfactorily stabilize rigid polyvinyl chloride are polymeric phosphites. The rigid polyvinyl chloride resins normally do not contain over 10% plasticizer and can be completed devoid of plasticizer.

The invention will be illustrated by the following examples, but it is to be understood that the invention is not limited thereto but is fully applicable to the breadth of the foregoing disclosure. In the examples all percentages and parts are by weight unless otherwise stated.

EXAMPLE 1

135 grams (1 mole) of trimethanol propane were heated to about 110° C. with 310 grams (1 mole) of triphenyl phosphite and with 3 grams of diphenyl phosphite and subjected to vacuum distillation at 8 to 10 mm. until 188 grams (2 moles) of phenol were removed leaving a clear liquid in the pot. The reaction mixture was cooled by blowing nitrogen through the pot and then fractionated. The 2-phenoxy, 5-ethyl, 5-hydroxymethyl-1,3,2-dioxaphosphorinane was recovered. The product had the formula

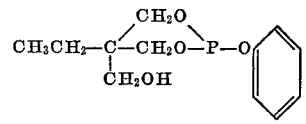

EXAMPLE 2

514 grams (2 moles) of the 2-phenoxy, 5-ethyl, 5-hydroxymethyl 1,3,2-dioxaphosphorinane of Example 1 and 480 grams (2 moles) of hydrogenated bis-phenol A were heated at increasing temperatures in the presence of 5 grams of diphenyl phosphite as a catalyst while being subjected to vacuum distillation at 5 to 10 mm. until about 2 moles of phenol and 1 mole of water were distilled off. The residue in the pot was about 714 grams of viscous liquid product together with the diphenyl phosphite catalyst. The catalyst was removed by vacuum fractionation to yield the purified product of the formula of (1a) where $R_2$ is—

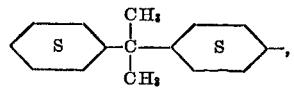

R is —$CH_2CH_3$ and $R_3$ is H and $n$ is 2.

EXAMPLE 3

The procedure of Example 1 was repeated replacing the trimethanol propane with trimethanol decane and the corresponding 5-nonyl dioxaphosphorinane was recovered.

EXAMPLE 4

The 5-nonyl dioxaphosphorinane of Example 3 was used in the procedure of Example 2 to replace the 5-ethyl dioxaphosphorinane and produced the product of Example 2 except that R is octyl.

EXAMPLE 5

The procedure of Example 2 was repeated replacing the 5-ethyl dioxaphosphorinane with the 5-chloropropyl dioxaphosphorinane and produced the product of Example 2 except that R is chloropropyl.

EXAMPLE 6

The procedure of Example 1 was repeated except the trimethanol propane and triphenyl phosphite was replaced with the following reactants:

$$R-C\begin{matrix}CH_2OH\\CH_2OH\\CH_2OH\end{matrix} \quad \text{and} \quad P\begin{matrix}OR_1\\OR_1\\OR_1\end{matrix}$$

where R is:
(A) $CH_3-$
(B) $CH_3(CH_2)_5-$
(C) $CH_2Cl(CH_2)_6-$
(D) $CH_2Cl(CH_2)_{10}$ where $R_1$ is:
phenyl
phenyl
decyl
nonyl phenyl

EXAMPLE 7

The reaction products of Example 6, i.e. (A), (B), (C) and (D) were serially reacted with the hydrogenated bisphenol A according to the procedure of Example 2. All of the products obtained were viscous liquids.

EXAMPLE 8

257 grams (1 mole) of 2-phenoxy, 5-ethyl-5-hydroxymethyl 1,3,2-dioxaphosphorinane was heated at increasing temperatures with 310 grams (1 mole) of triphenyl phosphite and 3 grams of diphenyl phosphite under a vacuum of 5 to 10 mm. until 94 grams (1 mole) of phenol were removed. The reaction mixture was then cooled and vacuum fractionated to recover purified the 2-phenoxy-5-(diphenyl phosphite methoxy)-5 ethyl, 1,3,2-dioxaphosphorinane product of the formula

EXAMPLE 9

950 grams (2 moles) of the product of Example 8 were heated at increasing temperatures with 600 grams (2.5 moles) of hydrogenated bis-phenol A under 8 to 12 mm. vacuum and with 6 grams of diphenyl phosphite until approximately 185 grams (approximately 2.5 moles) of phenol were distilled off. The cooled product was a glassy solid and had the formula of (Ib) where $R_2$ is $R_1$ is phenyl, R is $-CH_2CH_3$ and $n$ is 4.

EXAMPLE 10

The procedure of Example 8 was repeated replacing serially the triphenyl phosphite with trimethyl phosphite, trioctyl phosphite, tridodecyl phosphite, tri (nonylphenyl) phosphite, trichlorobutyl phosphite and trichlorodecyl phosphite. There was produced, respectively, 2-phenoxy-5 (dimethyl phosphite methoxy)-5 ethyl, 1,3,2-dioxaphosphorinane and the 2-phenoxy-5 (dioctyl phosphite methoxy)-5 ethyl, 1,3,2-dioxaphoshporinane, 2-phenoxy-5 (didodecyl phosphite methoxy)-5 ethyl, 1,3,2-dioxaphosphorinane, 2-phenoxy-5 (di-nonylphenyl phosphite methoxy)-5 ethyl, 1,3,2-dioxaphosphorinane, 2-phenoxy-5 (dibutyl phosphite methoxy)-5 ethyl, 1,3,2-dioxaphosphorinane and 2-phenoxy-5(dichlorodecyl phosphite methoxy)-5 ethyl 1,3,2-dioxaphosphorinane.

EXAMPLE 11

Each of the products of Example 10 were serially reacted with bis-phenol A and the corresponding products were obtained. Each product obtained was a glassy highly viscous semi-solid.

EXAMPLE 12

2 moles of 2-phenoxy-5-(diphenyl phosphite methoxy)-5 ethyl, 1,3,2-dioxaphosphorinane was heated with 3.2 moles of hydrogenated bis-phenol A under a vacuum of 8 to 12 mm. and with 8 grams of diphenyl phosphite until 4 moles of phenol was distilled off. The product had the formula and was a glassy solid.

EXAMPLE 13

The procedure of Example 12 was repeated but using 8 moles of the phosphorinane and 12.8 moles of the hydrogenated bis-phenol A and splitting out 19 moles of phenol. The product had the formula where $R_2$ was $R_1$ was phenyl,
Q was $n$ was 2.

EXAMPLE 14

The procedure of Example 13 was repeated with 20 moles of the phosphorinane and 32 modes of hydrogenated bisphenol A with 49 moles of phenol being split out.

The product was a hard glassy solid with the formula as in Example 13 except $n$ was 8.

EXAMPLE 15

The procedure of Example 12 was repeated except that there is used 2 moles of 2-phenoxy-5-(phenyl,p-nonyl phenyl phosphite methoxy)-5 ethyl, 1,3,2-dioxaphosphorinane with 3.2 moles of hydrogenated bisphenol A. The product is a glassy solid having pendant p-nonylphenyl groups.

EXAMPLE 16

The procedure of Example 12 was repeated except there is used 2 moles of 2-phenoxy-5-(phenyl, stearyl phosphite methoxy) - 5 - ethyl,1,3,2-dioxaphosphorinane with 3.2 moles of hydrogenated bisphenol A. The product is a glassy solid having pendant stearyl groups.

EXAMPLE 17

The procedure of Example 12 is repeated except that 2 moles of 2 - phenoxy - 5 - (phenyl, isodecyl phosphite methoxy)-5-ethyl,1,3,2-dioxaphosphorinane is used with 3.2 moles of hydrogenated bisphenol A. The product is a glassy solid.

EXAMPLE 18

1 part of the product of Example 12, 2 parts of barium-cadmium laurate and 100 parts of rigid polyvinyl chloride were ground and mixed together with heating. The mixed resin showed good stabilization.

EXAMPLE 19

1 part of the product of Example 13, together with 2 parts of calcium stearate were milled into 100 parts of polyvinyl chloride and 50 parts of dioctyl phthalate to give a stabilized product.

EXAMPLE 20

1 part of the product of Example 14 was heated on a mill and milled into 100 parts of polyvinyl chloride, 50 parts of dioctyl phthalate and 2 parts of calcium stearate to give a stabilized product.

EXAMPLE 21

The procedure of Example 12 is repeated except that 2 moles of 2-phenoxy-5-(phenyl, oleyl phosphite methoxy)-5- ethyl, 1,3,2-dioxaphosphorinane is used with 3.2 moles of hydrogenated bisphenol A. The product is a glassy solid having pendant oleyl groups.

As will be appreciated, the hydrogenated dihydric phenol residue of the present phosphites may have the formula

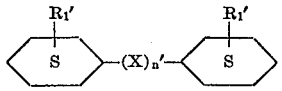

where $R'_1$ is hydrogen or alkyl, X is O, S, $SO_2$ or

where $R'_2$ and $R'_3$ are hydrogen, lower alkyl or phenyl and $n'$ is zero or one.

As noted above, the mole ratios of the reactants may vary depending upon the end groups reacted. Hence, with regard to formula (1a) if 1 mole of formula (2b) is reacted with 1 mole of formula (3) the product will be:

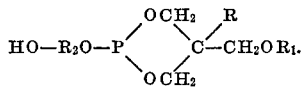

However, if 2 moles of (2b) are reacted with 1 mole of (3) the product will be

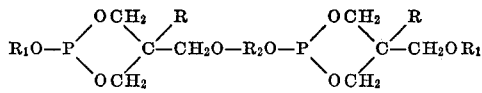

with no end group reacted. The results will be similar in the reaction to produce the products of formula (1b) or (7). Likewise, if 2 moles of (2b) are reacted with 2 moles of (3) one end group will be —$CH_2O$—$R_2$—OH or if 3 moles of (3) are reacted each end group will be likewise terminated by —OH. Hence all of these combinations are included, by present definition in the formulae of the products, noted above.

Also, as can be appreciated, the number of moles of $R_1OH$ split out will depend on the number of repeating units and the number of end groups reacted. For example, when formula (6) is reacted with formula (3) and no end group reaction is desired, the moles will be as follows:

| No. of repeating units | Moles of formula (6) | Moles of formula (3) | Moles of $R_1OH$ split | Increase in mole of $R_1OH$ for add. unit |
|---|---|---|---|---|
| 2 | 2 | 1 | 2 | |
| 3 | 3 | 2 | 4 | 2 |
| 4 | 4 | 3 | 6 | 2 |
| 5 | 5 | 4 | 8 | 2 |
| 6 | 6 | 5 | 10 | 2 |
| 7 | 7 | 6 | 12 | 2 |
| 8 | 8 | 7 | 14 | 2 |
| 9 | 9 | 8 | 16 | 2 |

However, if one end group is to be reacted, the moles of formula (3) must be increased by 1 or if both end groups are to be reacted, the moles of formula (3) must be increased by 2. Of course, the moles of $R_1OH$ split out will also increase by 1 or 2, respectively. In other words, the number of moles of $R_1OH$ split out will be 2 times the number of moles of formula (3) used in forming the repeating units plus 1 additional mole of $R_1OH$ for each end group reacted. An analogous situation exists for each of the products of the invention.

What is claimed:

1. Phosphites of the formulae (1)

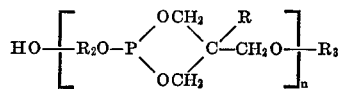

and (2)

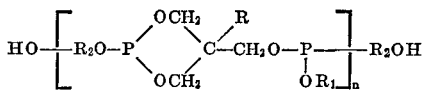

and the position isomers thereof and where R is hydrogen or alkyl of up to 20 carbon atoms, $R_1$ is phenyl, naphthyl, alkyl of up to 20 carbon atoms, halo phenyl, halo naphthyl, halo alkyl of up to 20 carbon atoms, alkyl phenyl of up to 20 carbon atoms in the alkyl group, alkyl naphthyl of up to 20 carbon atoms in the alkyl group, alkenyl of 3 to 18 carbon atoms, halo alkenyl of 3 to 18 carbon atoms, or benzyl, and where the halo group is Cl, Br or I, $R_2$ is a hydrogenated dihydric phenol moiety having the formula

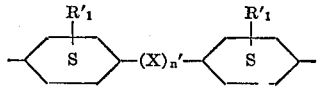

wherein $R'_1$ is hydrogen or alkyl, X is O, S, $SO_2$ or

where $R'_2$ and $R'_3$ are hydrogen, lower alkyl or phenyl and $n'$ is zero or 1, $R_3$ is H or $R_1$ and $n$ is integer of 1 to 100.

2. Phosphites of the formula

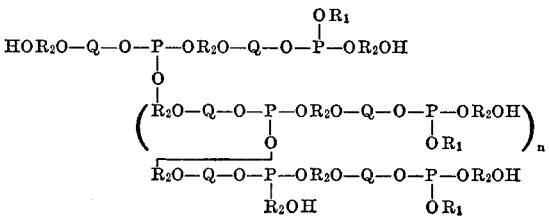

and the position isomers thereof and where Q is

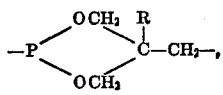

$n$ is 0 to 100 and R is hydrogen or alkyl of up to 20 carbon atoms, $R_1$ is phenyl, naphthyl, alkyl of up to 20 carbon atoms, halo phenyl, halo naphthyl, halo alkyl of up to 20 carbon atoms, alkyl phenyl of up to 20 carbon atoms in the alkyl group, alkyl naphthyl of up to 20 carbon atoms in the alkyl group, alkenyl of 3 to 18 carbon atoms, halo alkenyl of 3 to 18 carbon atoms or benzyl, and where the halo group is Cl, Br or I, $R_2$ is a hydrogenated dihydric phenol moiety having the formula

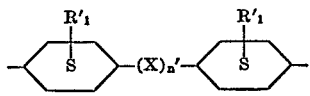

where $R'_1$ is hydrogen or alkyl, X is O, S, $SO_2$ or

where $R'_2$ and $R'_3$ are hydrogen, lower alkyl or phenyl and $n'$ is zero or 1.

3. The phosphites of claim 1 wherein the phenol moiety is hydrogenated bis-phenol A.

4. The phosphites of claim 2 wherein the phenol moiety is bis-phenol A.

5. The phosphites of claim 1 formula (1) where $R_2$ is

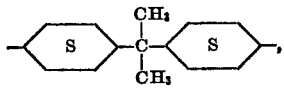

R is —$CH_2CH_3$, $R_3$ is H, and $n$ is 2.

6. The phosphites of claim 1 formula (2) wherein $R_2$ is

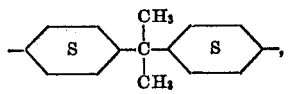

$R_1$ is phenyl, R is —$CH_2CH_3$, and $n$ is 2.

7. A phosphite according to claim 1 wherein the hydrogenated dihydric phenol residue is a residue of an alkylidene bisphenol.

8. A phosphite according to claim 2 wherein $R_2$ is a residue of an alkylidene bisphenol.

9. A phosphite according to claim 1 having formula (1).

10. A phosphite according to claim 1 having formula (2).

11. A composition according to claim 1 where $n$ of formula (2) is equal to 2.

References Cited
UNITED STATES PATENTS

| 3,576,917 | 4/1971 | Friedman | 260—927 R |
| 3,576,918 | 4/1971 | Rattenbury | 260—927 R |
| 3,576,919 | 4/1971 | Rattenbury | 260—927 R |

LORRAINE A. WEINBERGER, Primary Examiner
R. L. RAYMOND, Assistant Examiner

U.S. Cl. X.R.
260—45.7 P, 937